US007046828B1

(12) United States Patent
Gibbs et al.

(10) Patent No.: US 7,046,828 B1
(45) Date of Patent: May 16, 2006

(54) METHOD AND SYSTEM FOR VERIFYING AND AUTHENTICATING SIGNED COLLECTIBLES

(76) Inventors: Jerald R. Gibbs, 1333 Eldridge Pkwy., #124, Houston, TX (US) 77077; Harlan J. Werner, 444 N N. Windsor, Los Angeles, CA (US) 90004

( * ) Notice: Subject to any disclaimer, the term of this patent is extended or adjusted under 35 U.S.C. 154(b) by 597 days.

(21) Appl. No.: 10/123,815

(22) Filed: Apr. 15, 2002

Related U.S. Application Data

(60) Provisional application No. 60/283,827, filed on Apr. 13, 2001.

(51) Int. Cl.
*G06K 9/00* (2006.01)
*B41M 3/14* (2006.01)

(52) U.S. Cl. .......................................... 382/119; 427/7

(58) Field of Classification Search ................ 382/115, 382/119, 283, 305, 312; 427/7; 283/72, 283/88; 235/491
See application file for complete search history.

(56) References Cited

U.S. PATENT DOCUMENTS 5,139,812 A * 8/1992 Lebacq .......................... 427/7
5,267,756 A 12/1993 Molee et al.
5,306,049 A 4/1994 Schireck
5,360,628 A * 11/1994 Butland .......................... 427/7
5,380,047 A 1/1995 Molee et al.
5,673,338 A 9/1997 Denenberg et al.
5,737,886 A * 4/1998 Kruckemeyer ............... 283/67
5,971,435 A 10/1999 DiCesare et al.
6,030,001 A 2/2000 Kruckemeyer
6,082,774 A * 7/2000 Schlauch ..................... 283/67
6,102,207 A * 8/2000 Carse ...................... 206/459.1
6,203,069 B1 * 3/2001 Outwater et al. ............. 283/88
6,309,690 B1 * 10/2001 Brogger et al. ................ 427/7
6,536,672 B1 * 3/2003 Outwater .................... 235/491

* cited by examiner

*Primary Examiner*—Kanjibhai Patel
(74) *Attorney, Agent, or Firm*—Blakely Sokoloff Taylor & Zafman

(57) ABSTRACT

A system and method for verifying the identity of an authenticated item such as memorabilia and collectibles where each authenticated item is assigned a unique identifier. Also, digital image is taken of the item and a profile created for the item and recorded in a database. The digital image and profile of the item is then accessible over the Internet by use of the unique identifier. The identity of an item can be verified by comparing the item to the digital image and profile information.

20 Claims, 4 Drawing Sheets

METHOD AND SYSTEM FOR VERIFYING AND AUTHENTICATING SIGNED COLLECTIBLES

CROSS-REFERENCE TO RELATED APPLICATION

This is a non provisional application claiming the benefit of the provisional application Ser. No. 60,283,827 filed Apr. 13, 2001.

BACKGROUND (1) Field of the Invention

The invention relates to authenticating collectibles and memorabilia. More specifically, the invention relates to a method and system for verifying authenticated collectible items, including autographed items.

(2) Background

The value of many collectibles and memorabilia is dependent on the ability of the owner or potential buyer to verify the authenticity of an item. Buyers of an item seek to avoid purchasing fraudulent reproductions of collectibles and memorabilia. Often verifying the authenticity of an item requires the mutual acceptance of a trusted third party that provides an expert opinion or history of the item.

Owners selling items over the Internet or at a distance from the seller lack an easy mechanism for providing evidence of an item's authenticity. Even after an item is received it may be difficult for an individual who is not an expert to discern whether the item is genuine. Even verifying the authenticity of an item that is newly created can be difficult. Thus, there is a need for a system to provide verification of the authenticity of collectibles and memorabilia that can work for electronic commerce as well as traditional commerce.

SUMMARY OF THE INVENTION

A method and system for verifying the authenticity of collectibles and memorabilia is presented. Representative of a method is witnessing the signing of an item. Photographing the item signed. Storing the photograph digitally along with a unique label and other information about the item autographed. Attaching a physical label to the item. The stored information including the photograph of the item is then uploaded to a database on a server. This information is then accessible by a browser over the Internet so that an individual can compare the actual item or a fraudulent item to the photograph and accompanying information to verify the authenticity of an item.

Representative of a system is a digital camera to capture an image of an item known to be authentic. A database to store the image and information about the item. A physical label to affix to an item to identify the item and allow it to be easily searched for in the database. A computer coupled to a network for inputting information about the item and for loading the image of the item into the database. A certificate to accompany the item which carries the label. A browser to access the database over the network. This system enables the affixing of a unique label to an item determined to be authentic and for the viewing of an image of the item and information about the item in a browser over a network using the label as a query to the database.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
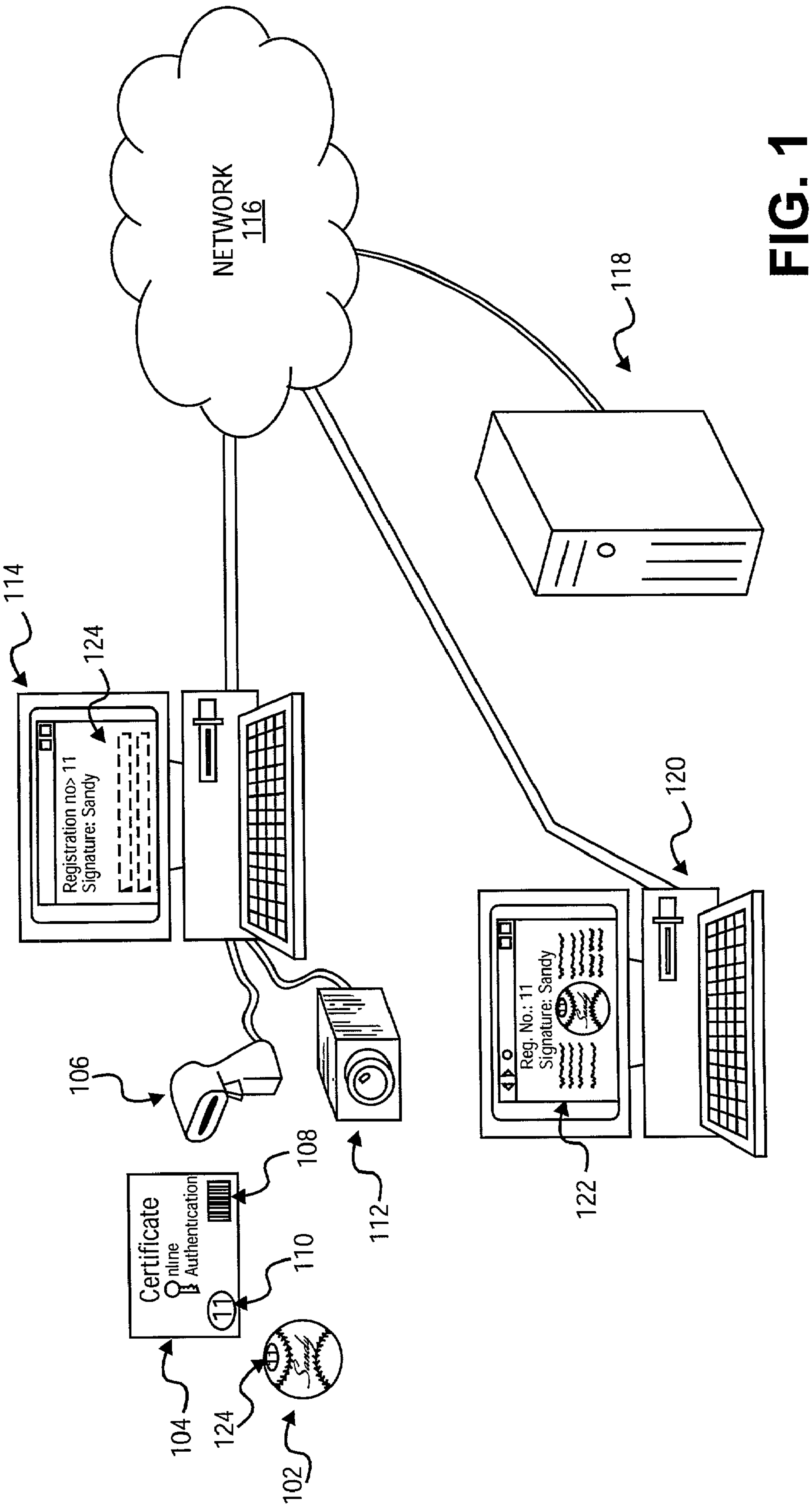
FIG. 1 is an illustration of a system for the recordation and display of information and images related to an authentic item.

FIG. 1 is an illustration of a system for verifying the authenticity of an item. In one embodiment, an item to be authenticated, for example baseball 102, is signed in front of a witness (not shown). The witness who is part of the authenticating process vouches for the authenticity of the signature (e.g., the witness saw that the signature on baseball 102 is the proper signature of the individual who signed it). The system further includes the use of a physical tag (e.g., a sticker 126) as a manner of affixing a label 110 on the item 102. A certificate 104 accompanies the item 102 to provide further information about the authenticity of the item 102. The certificate 104 bears the label 110 as well as a barcode 108 associated with the label 110. A barcode reader 106 is used to input the label 110 into a computer 114 running an application 124 for inputting information about item 102 into a database. A camera 112 is also connected to computer 114 and the camera 112 is used to capture an image of item 102. The application 124 is used to create a profile for the item 102 which is then merged into a database over a network 116 that is on server 118. This system thus allows computer 120 or similar devices connected to the network 116 to access the database on server 118 using an application 122 (e.g., a browser or similar application) to view the profile and image of the item 102.

Figure 2:
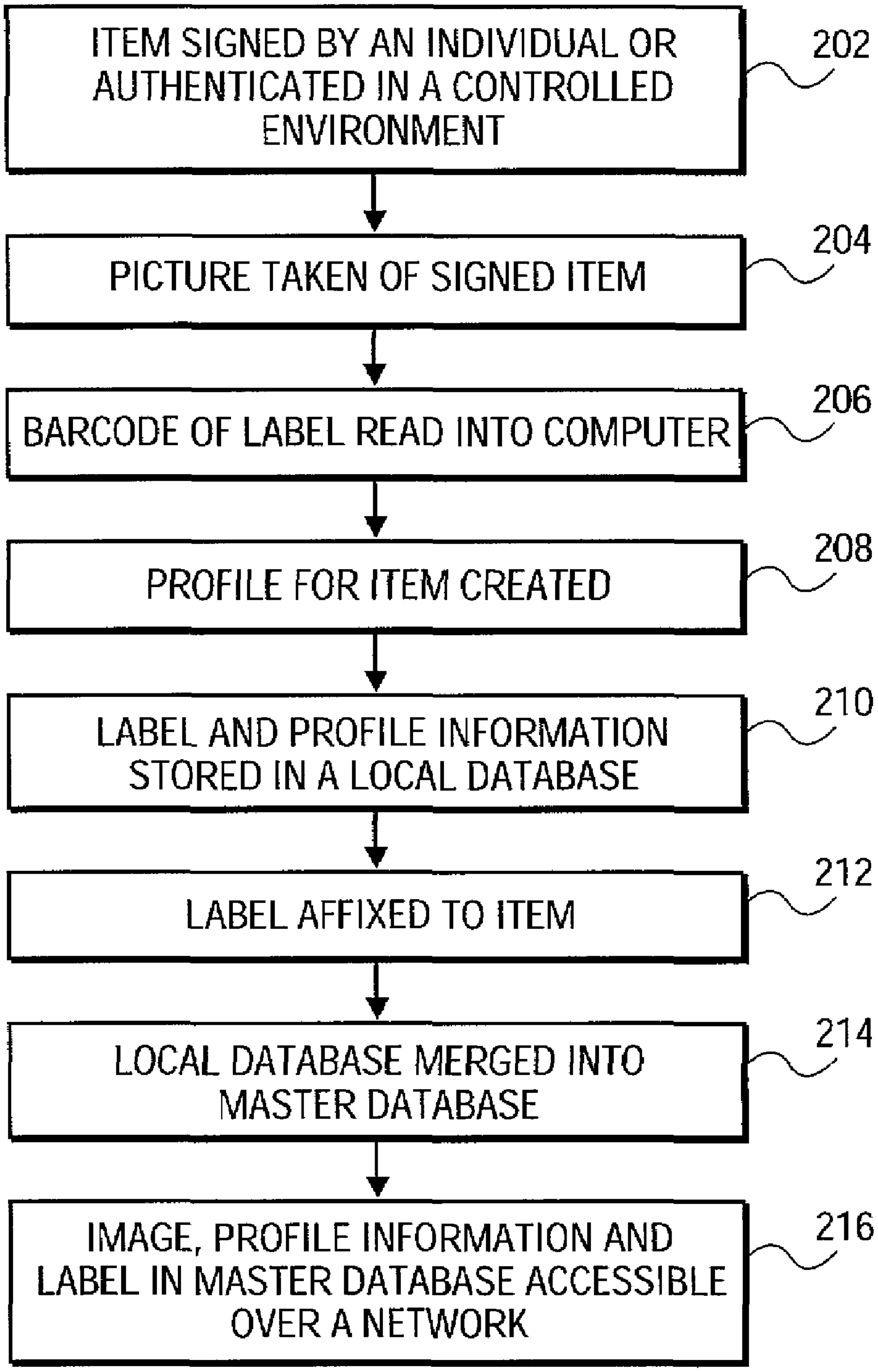
FIG. 2 is a flowchart of a method for recording an authentic item in a controlled environment.

FIG. 2 is a flowchart of a method for verifying the authenticity of an item that has been signed by an individual. For example, a well-known baseball player may sign a baseball. In one embodiment, an individual, often a celebrity or well-known individual, sports star or the like, signs an item 102 in the presence of witnesses but not in a setting open to the public (block 202). An exemplary setting, would be a celebrity signing pictures in a private room with only individuals present for the purpose of witnessing the signature and further verifying the authenticity of the item signed. One skilled in the art would understand that items other than autographed items could be authenticated in a controlled environment in a similar manner. An example of another controlled environment would be a private room where an artist completes a work of art with others present to participate in the verification process or where an expert renders an opinion on an item 102 regarding its authenticity.

In one embodiment, the authentic item 102 is taken to a camera 112 or other imaging device (e.g., a scanner, video recorder or the like) in a short time period after creation or determination of authenticity where the authentic item 102 does not leave the effective control of individuals participating in the verification process. An image of the authentic item 102 is then captured (block 204). In one embodiment, the resolution of the image taken is 640 by 480 pixels. The resolution and scope of the image taken can vary depending on the nature of the item being imaged. The image is taken to provide a visual benchmark with which to compare an authentic item 102 or fraudulent item in order to determine if that item is the imaged item 102. For example, if an image is taken of an autographed picture, the autograph and the area of the picture around the autograph may be imaged. This would allow for a higher resolution image of the autograph to be taken without a large image having to be stored. The autograph in this example would be one of the most important characteristics in verifying the authenticity of the picture and autograph because the autograph would be the most difficult aspect of the item to reproduce. Further, some context would be given to the autograph by that area of the picture that is also imaged. In an alternate embodiment, multiple images of the authentic item 102 are taken. This can assist in identifying characteristics of the item 102. For example, both sides of a baseball card can be imaged and stored to identify the card better. In another embodiment, the images are magnified images of the authentic item 102 that allow greater detail in the characteristics of the authentic item 102 to be seen by the unaided eye. This increases the accuracy of the verification system. For example, a potential buyer can examine the autograph on a baseball card with a magnifying glass and compare his observations of the autograph with the magnified image of the authentic item 102 to verify the item's identity.

In one embodiment, certificates 104 each including a unique label 110 are preprinted. These preprinted certificates 104 include a barcode 108, which is associated with the label 110 in the certificate 104. A label 110 may be any combination of uniquely identifying characters or symbols. For example, a number could serve as a unique identifier or a combination of numbers and letters or other similar symbols. A barcode 108 would be associated in a one to one manner with each unique label 110. When a barcode 108 on a certificate 104 is scanned by a barcode reader 106 a data input application 124 receives the input barcode 108 and translates it into the unique label 110 (block 206).

In one embodiment, a profile is created for the authentic item 102 (block 208). This profile includes information about the item 102 and its history. This information is recorded and associated with the unique label 110. Information stored in the profile includes names of individuals who signed the item 102 (if any), writing device used to make the signature, the type of the item 102, the origin of the item 102, the date the item 102 was signed, owner of the item 102, history of the item's 102 ownership, manufacturer of the item 102 and similar information. For example, a photograph autographed by a boxer may have a profile that includes the name of the boxer, the type of item being a picture, description of the picture (e.g., 16 inch by 20 inch picture of the boxer in the ring), origin of the picture (e.g., the company for which the boxer signed the picture), date of the signature, type of writing utensil used (e.g., blue ink felt tip pen). One skilled in the art would understand that any combination of information could be recorded about the item 102.

In one embodiment, the profile information is stored in a database (block 210). The profile information along with the image is input into a database like Microsoft Access, published by Microsoft Corporation. The database is configured to be a relational database. The key for the set of information associated with a profile for the authentic item 102 is the unique label 110. Alternatively, the unique label 110 can be part of the information in the profile and a separate unique key can be generated to be associated with the set of information in the profile stored in the relational database. One skilled in the art would understand that other types of databases could be used that maintain relationships between types or instances of data (e.g., object-oriented databases).

In one embodiment, a physical unique label 110 associated with the authentic item's profile is attached to the authentic item 102 (block 212). For example, the label 110 may be a number printed onto a sticker 126 and the item may be a picture. The sticker 126 is then affixed by its adhesive backside to some portion of the picture or to a protective covering for the picture. Multiple stickers carrying the same label 110 may be affixed to different portions of the authentic item 102. Alternatively, a label 110 may be printed or stamped directly only a surface of the authentic item 102 using a printer, stamp, seal or the like. In one embodiment, the stamp, sticker 126 or printing also includes information about the organization or company that maintains the records related to the authentic item 102 (e.g., including the Internet address of the company that maintains the profile of the item 102).

In one embodiment, the database in which the item profile has been stored is a temporary local database that contains records of profiles recently entered. For example, this database may reside on a laptop or other portable computers (e.g., handheld devices or the like) to facilitate recordation of profiles of authentic items 102 in places where traditional computers are not easily available. This local database is merged into a master database (block 214), which is the permanent storage site for the profiles. The merger operation checks for data coherency between the local database and the master database. The data coherency check includes verifying that a profile does not already exist on the master, that multiple profiles associated with the same unique label 110 do not exist, and similar verification steps known in the art that assure that data is not lost in the merger and that the database retains it organization and coherency. In one embodiment, once the data from the local database has been successfully merged with the master database, the records on the local database are erased to promote data coherency when subsequent mergers take place. In one embodiment, there are multiple local databases on the same or different computing devices. In this embodiment, the merger operation supports multiple local databases merging with the master database using techniques well known in the art.

In one embodiment, the master database resides on a server 118 with a web server application 414 or the database is accessible to a web server application 414. The database is made accessible via the web server application 414 to users over a network 116 using browser applications 122 or the like (block 216). For example, the web server 414 may transmit a web page in response to a hypertext transfer protocol (http) request to a user over the network 116. The web page includes a textbox and submission button or link that allows the user to submit a query via the web server application 414 to the master database. The master database returns the information (if any) associated with the query terms to the web server application 414. The web server application 414 is configured to generate hypertext markup language (html) pages to return to the user, which incorporate the information returned by the query.

Figure 3:
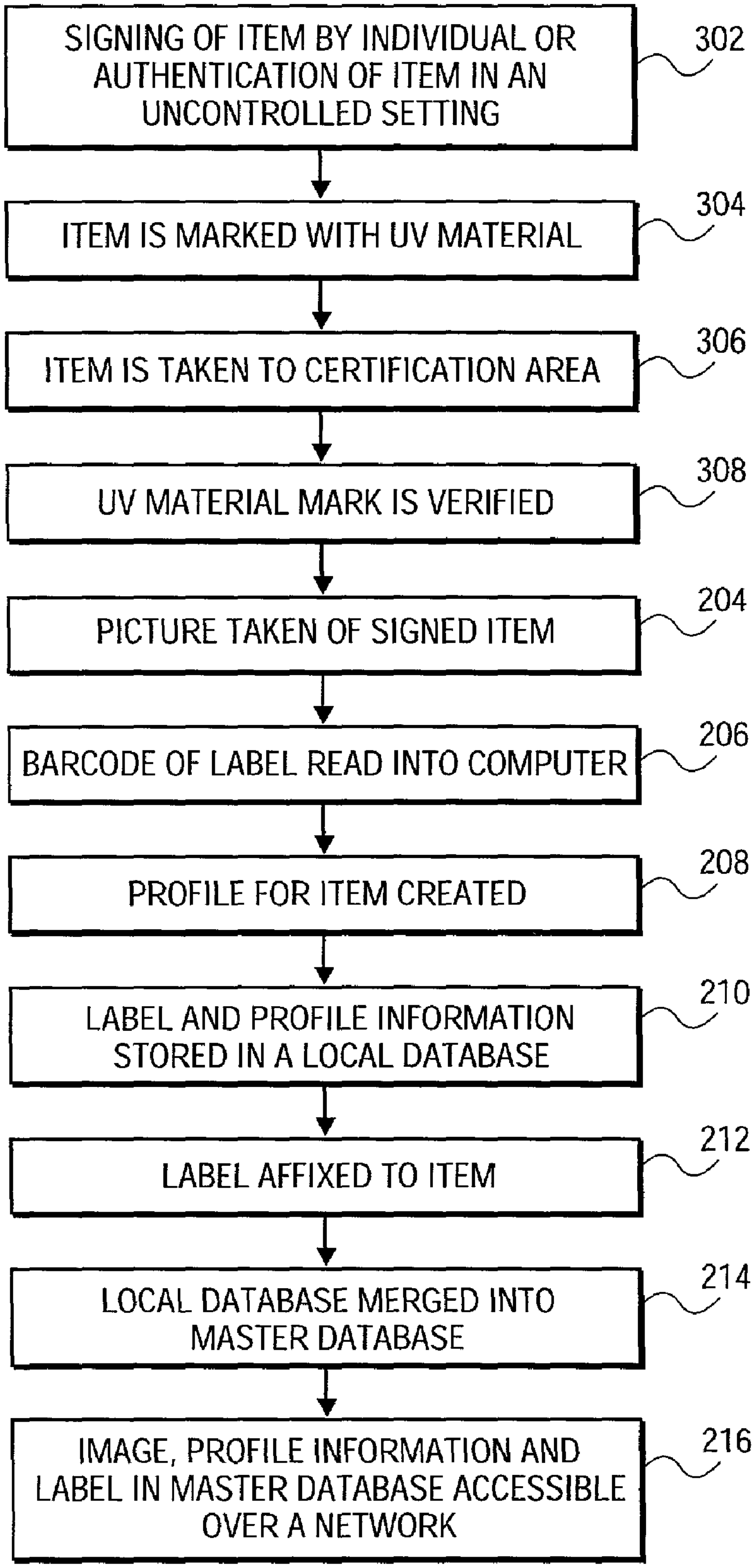
FIG. 3 is a flowchart of a method for recording an authentic item in an uncontrolled environment.

FIG. 3 is a flowchart of a method for verifying the authenticity of an item that has been signed by an individual in an uncontrolled environment. In one embodiment, an uncontrolled environment is a situation when not all the individuals in a space where an item is being signed or authenticated are involved in the verification process. For example, a public book signing at a bookstore open to the public is an uncontrolled environment. After a book has been signed by an author, an individual whose book was signed is not likely to be under the effective control of individuals involved in the authentication process while the book is taken to a space where the book can be recorded and a certificate issued.

In one embodiment, the item to be authenticated is autographed by an individual or group in the presence of a witness or is other wise judged to be authentic (e.g., by an expert opinion) (block 302). This takes place at a location where not every individual present is involved in the verification process. This situation leaves open additional opportunities for a fraudulent item to be switched with an authentic item or passed off as an authentic item 102. The authentic item 102 must travel outside the effective control of individuals involved in the verification process.

In one embodiment, after the item 102 has been signed or otherwise authenticated a witness in the verification process marks the item 102 using an ink not visible to the unaided eye under normal light conditions (block 304). In one embodiment, the pen used to mark the item 102 contains Invisible Red I-660 ink, manufactured by Shannon Luminous Materials, Inc. When exposed to UV light, for example from a black light lamp manufactured by Lite-Ups, Inc., the ink will appear as a red marking. In one embodiment, the revealed color of the ink is a proprietary color, or a color of UV reflective material not commonly sold to the public. In one embodiment, the shape of the mark made is a distinct set of characters (e.g., a written name or number). The UV ink or material is temporarily affixed to the authentic item 102 and does not permanently alter the characteristics of the item 102. In one embodiment, the UV material or ink mark is made by a stamp, printer or other mechanized process to create a set of symbols on the item 102.

In one embodiment, the item 102 is taken to a certification area after being marked by the UV material (block 306). For example, at a show where several individuals are autographing items at various locations, a certification area may be set up to allow individuals to obtain certification for their item. After an individual obtains an autograph on an item 102 and a witness who is part of the verification process marks that item 102, the owner of the item 102 can elect to take the item 102 to the certification area. In another embodiment, the certification area may require the owner to travel some distance or to ship the item 102 to a location to be certified.

In one embodiment, when the item 102 to be certified arrives in the certification area the black light is used by an individual who is part of the verification process to visually verify that the marking is a predetermined type or color of mark known to be used for the process (block 308). In one embodiment, the type of marking used may be alternated based on the day, type of item 102, organization using the verification process, or similar circumstance. This improves the accuracy of the verification process by making reproduction of a UV mark more difficult and preventing fraudulent items from being certified. In an alternate embodiment the marking is read by a mechanized or electronic process (e.g., image recognition, wavelength detection or the like).

In one embodiment, after the item 102 has been verified by the Uv marking, the remainder of the certification process can be carried out as though in a controlled environment. The authentic item 102 is imaged (block 204). The barcode 108 associated with a unique label 110 is scanned into a computer 114 (block 206). A profile is created for the item 102 and associated with the unique label 110 (block 208). The profile information, image and unique label 110 are stored in the local database (block 210). A physical label 126 is attached to the authentic item 102 (block 212). The local database is merged into a master database (block 214). The image, profile information and unique label 110 are made accessible to browsers 122 or the like over a network 116 (block 216).

In one embodiment, an instance of the master database is recorded on a computer readable medium such as a compact disk. These copies of the database can be used to search for an item in the database when a network connection is unavailable or not of sufficient quality to easily accomplish the task.

Figure 4:
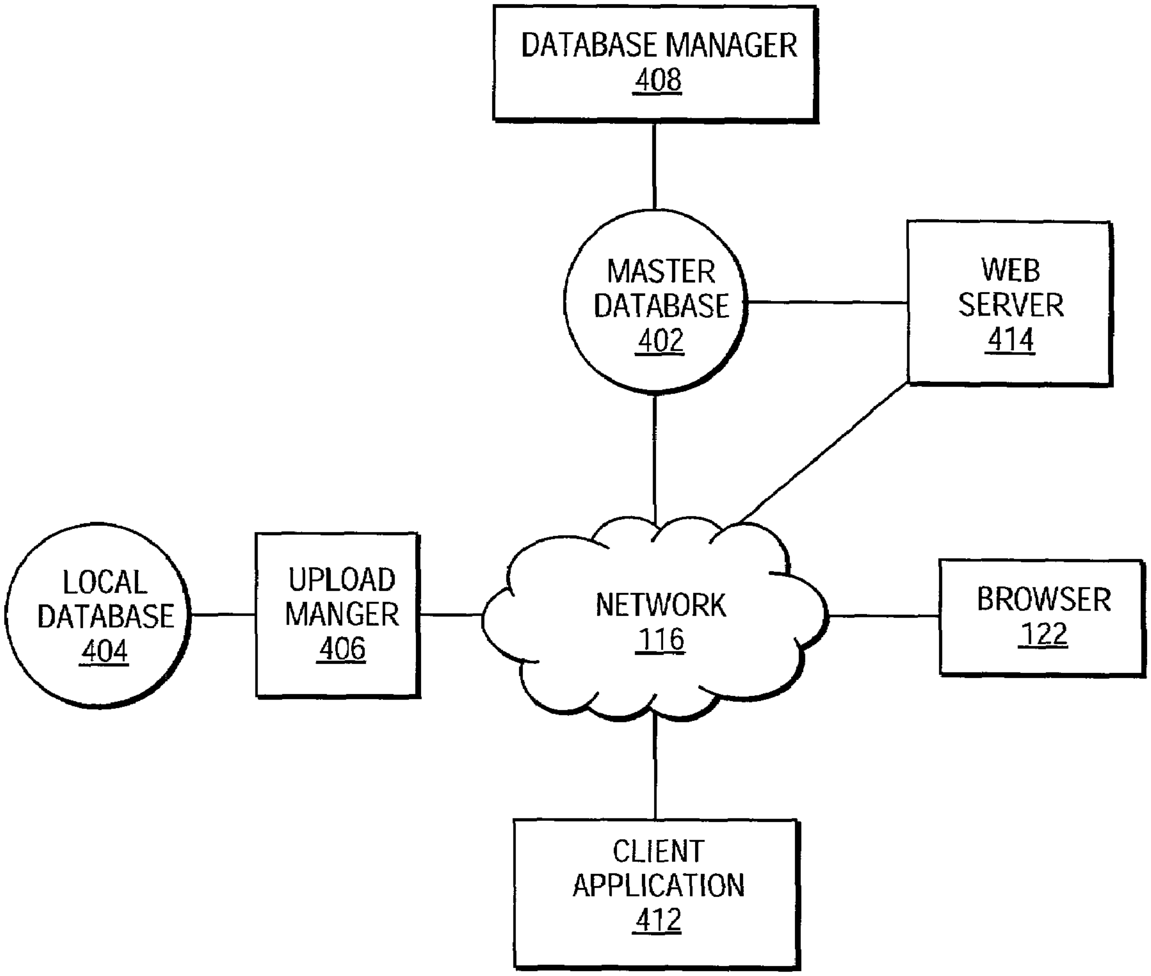
FIG. 4 is a block diagram of the verification database system.

FIG. 4 is a functional block diagram of the verification database system. In one embodiment, a management application 408 is present on the server 118 or a computer 114 with a local database 404. The management application 408 allows for the editing of profiles in the master database 402 including creating or deleting the profiles. In one embodiment, the management application 408 is implemented as a set of web pages that allow for the viewing and alteration of information in the database 402 or characteristics of the database 402 itself.

In one embodiment, the database 402 is accessible over a network 116 using a browser 122. The browser 122 accesses a set of web pages that allow the submission of search terms to the database 402 to form a query. For example, an owner of an item 102 can access a web page at a known web address (e.g., the URL for the web site may be listed on the sticker 126 attached to the item 102 or on the certificate 104 associated with the item 102) and enter the unique label 110 in a text box in the web page and submit the label 110 via the browser 122 by clicking on a submit or search button. The browser 122 sends this information as an http request. The web server 414 on the server 118 receives this request and forms a query to the database 402 using the unique label 110. In an alternate embodiment, a helper application may form the query or the query may be formed and sent directly by the browser 122 to the database. In response to the query based on the unique label 110, the database outputs the data of the profile associated with the unique label 110. The web server 414 generates a web page to transmit to the browser 122 incorporating the data of the profile including the image of the item 102. In an alternate embodiment, any type of stored data in a profile can be searched for and the web server 414 will generate a web page or series of web pages to include the output from the database query.

In one embodiment, an item view is a web page generated from html, dynamic html, active server pages (ASP) and similar technologies. The item view can include all profile images or any subset thereof. The data that may be displayed includes: a registration number; a unique label 110, signature information, description of the type of item 102, type of writing device used for a signature (if any), origin of item 102 (e.g., who the item 102 was originally signed for, circumstances that generated the item 102 or the like), date of item 102 (e.g., date an item 102 was signed or created) an image of the item 102 and similar data regarding the item 102. The web page is created to display this information using a browser 122 or similar technology based on a query to the database 402 including one of the data elements in the profile for the item 102. In one embodiment, if a search results in multiple profiles being found then a preliminary listing page is generated a list of hyperlinks to the item view pages generated for each item profile that was returned. In an alternate embodiment, multiple returned profiles are displayed simultaneously in a single web page. One skilled in the art would appreciate that any combination of these two approaches could be used to display an item view.

In one embodiment, the profile images associated with an item 102 are accessible via a client application 412. The client application 412 program is an application dedicated to the verification process and is configured to access the database 402 over a network 116 or from a storage medium having a stored copy of the database, which is accessible to the computer 120 on which the client application 412 is running. In one embodiment, the client application 412 creates a secure connection to the database 402 over a network 116 to access information in the database 402.

In one embodiment, the item view web page and web server application 414 is configured to assist in online transactions and auctions (e.g., auctions held by EBAY, Inc.) by allowing hyperlinks directly to item views. This allows an individual trying to sell an item 102 that has a profile in the database 402 to create a direct link to the item view in the individual's auction or sale web page. This increases the ease of use for potential buyers to examine the profile and image of the item 102.

In one embodiment, the accuracy of the verification system is improved by maintaining additional images and profile information that are not publicly accessible but require additional measures to obtain access to the secret information. For example, allowing owners to establish a password for the secret information and to issue temporary access passwords for this secret information to potential buyers allows the owner to demonstrate the authenticity of an item 102. When an item 102 with a profile in the database 402 is sold the owner will pass the official password along with the item 102 and the new owner can change the password to maintain security.

In one embodiment, the images and profiles recorded in a local database 404 are transferred to the master database 402 using an upload manager 406. The upload manager 406 handles the transfer and merger operation of the local database 404 with the master database 402. In one embodiment, the update manager 406 uses a password protected uniform resource locator (URL) to access the master database 402. This password protects the master database 402 from being tampered with and protects the information and images in the database 402. The merger operation includes data coherency and validity checks to ensure that data is not lost in the process of transferring the data from the local database 404 to the master database 402. The upload manager 406 checks to ensure that redundant data is not generated by the transfer and that conflicting profiles do not exist in the master database 402. If conflicts are found these conflicts are logged and reported so they can be resolved by inspection of the files by a database administrator.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
receiving an authenticated object;
recording information about the authenticated object; and
providing access to said information about the authenticated object over a network, wherein the information includes publicly accessible information and secret information, the access to the secret information being controllable by an owner of the authenticated object.

2. The method of claim 1 further comprising:
labeling the object with a unique label; and
storing the unique label in a computer readable medium.

3. The method of claim 1 further comprising:
capturing an image of the authenticated object.

4. The method of claim 3 further comprising:
providing access to the image of the authenticated object over a network.

5. The method of claim 1 further comprising:
recording the information in a computer readable medium.

6. A method comprising:
witnessing an authentication of an object;
marking the object with an invisible material;
capturing a digital image of the object;
providing access to the digital image over a network and controlling access to secret information of the object by an owner of the object.

7. The method of claim 6 further comprising:
revealing the invisible marking to verify the identity of the object.

8. The method of claim 6 wherein the recording information is in a database.

9. The method of claim 6 wherein the providing access over a network is to display on a browser.

10. The method of claim 6 wherein witnessing the authentication is witnessing a signing of the object.

11. The method of claim 6 further comprising:
recording the information in a computer readable medium.

12. A system comprising:
an authenticated object;
a unique label coupled to the object;
a certificate containing the unique label; and
a database containing information about the object and an image of the object associated with the unique label;
wherein the information and image are accessible over a network, the information including publicly accessible information and secret information, the access to the secret information being controllable by an owner of the authenticated object.

13. The system of claim 12 wherein the information and image are accessible by a browser over the network.

14. The system of claim 12 further comprising:
a marker containing an invisible material to mark an authenticated object.

15. The system of claim 12 further comprising:
a digital camera for capturing an image of an authenticated object.

16. The system of claim 14 further comprising:
a device to detect the invisible material.

17. A system comprising:
a means for labeling an authenticated object;
a means for providing access to an image of the object over a network;
a means for providing access to information about the object over the network; and
a means for controlling access to secret information about the object by the owner of the object.

18. The system of claim 17 further comprising:
a means for capturing an image of an authenticated object.

19. The system of claim 17 further comprising:
a means for invisibly marking an authenticated object.

20. The system of claim 19 further comprising:
a means for revealing an invisible marking.

* * * * *